(No Model.)
C. DAVISON.
DRAFT EQUALIZER.
No. 595,940. Patented Dec. 21, 1897.
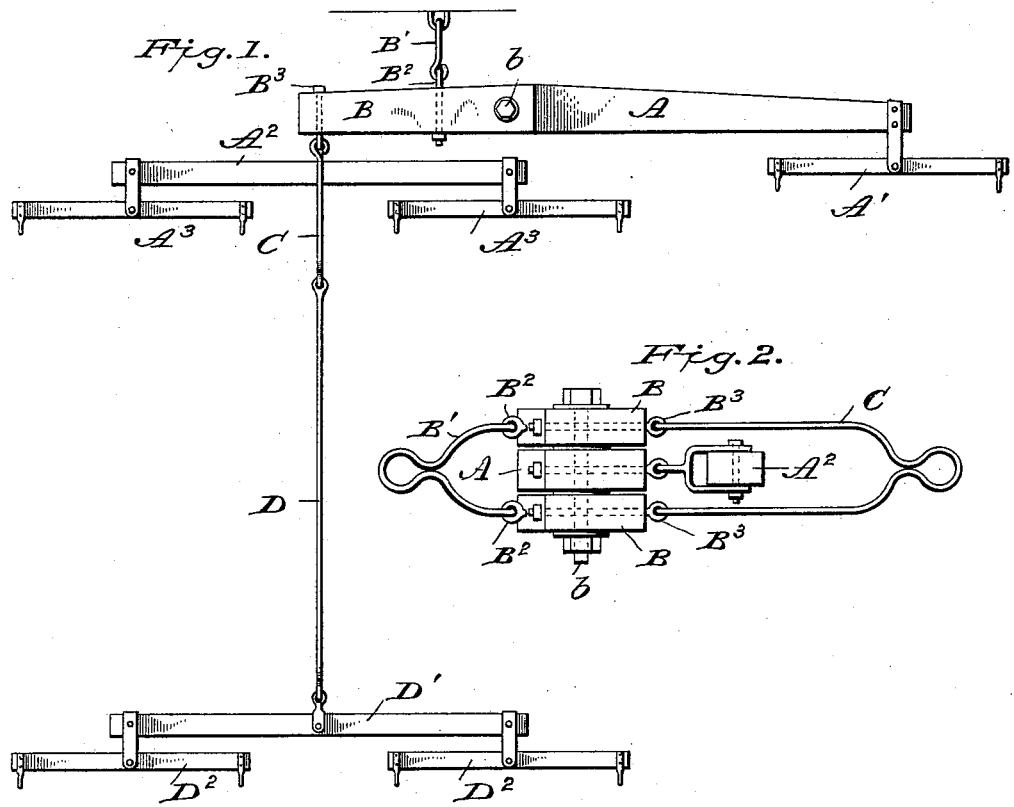
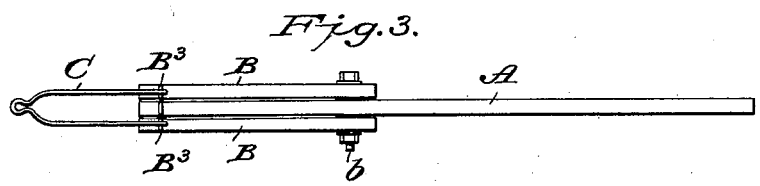
WITNESSES
L. S. Elliott.
Chas. Lowell
Charley Davison
INVENTOR
By Eugene W. Johnson
His Attorney

UNITED STATES PATENT OFFICE.

CHARLEY DAVISON, OF STANTON, NEBRASKA.

DRAFT-EQUALIZER.

SPECIFICATION forming part of Letters Patent No. 595,940, dated December 21, 1897.

Application filed October 2, 1897. Serial No. 653,793. (No model.)

*To all whom it may concern:*

Be it known that I, CHARLEY DAVISON, a citizen of the United States of America, residing at Stanton, in the county of Stanton and State of Nebraska, have invented certain new and useful Improvements in Draft-Equalizers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain new and useful improvements in draft-equalizers, the object of my invention being to provide a draft-equalizer the parts of which are so constructed and organized that it may be used effectively for hitching a team of five horses, so that three will be on a line and two in advance, the advance pair being in line with the pair which are coupled at the short end of the evener-bar.

In the accompanying drawings, which illustrate my invention, Figure 1 is a plan view; Fig. 2, a side elevation, and Fig. 3 a front elevation with one of the loops swung to one side.

In the accompanying drawings the reference-letter A indicates a long evener-bar, to which is pivoted a pair of short evener-bars B. The relative length of the short evener-bars is about one-third of the length of the bar A, measuring from the point of attachment of the clevises and the bolt or pivot-pin. The short bars B are connected to the bar A by a pin or bolt $b$, and the longer end of the bar A has coupled thereto, by a suitable clevis, a singletree A'.

B' refers to a loop or clevis, the forward ends being formed into eyes which engage with eyebolts $B^2$, attached to the short evener-bars B B, and by means of this loop or clevis B' the draft-equalizer is connected to the wagon or other object to which the horses are attached for draft purposes. The ends of the short evener-bars B B carry eyebolts $B^3$, to which is attached a loop C, the forward end being formed into an eye for connecting thereto a rod D, and on a line with the eyebolts $B^3$ the short end of the evener-bar A has an eyebolt and clevis for attaching thereto a doubletree $A^2$, said doubletree having suitably attached to its ends singletrees $A^3$.

To the forward end of the rod D is attached a doubletree D' and said doubletree carries singletrees $D^2$, the same being on a line though in advance of the doubletree $A^2$ and singletrees carried thereby. By the construction and arrangement herein shown and described I am enabled to hitch five horses so that three will work abreast and one pair will be in advance of the other pair, preferably on the right-hand side. The loop or clevis B' and C have their upper and lower members spread or separated from each other, so that the evener-bar A may swing in said loops or clevises and the doubletree $A^2$ lies between the upper and lower members of the loop or clevis C.

Having thus described my invention, what I claim as new, and desire to secure by Letters Patent, is—

1. In a five-horse draft-equalizer, an evener-bar A having pivoted thereto evener-bars B B, loops connected to said evener-bars B B, the outer loop extending forwardly and the inner one rearwardly, a singletree connected to the long end of the evener-bar A, and a doubletree to its short end, and a doubletree connected to the loop carried by the outer ends of the evener-bars B B, substantially as shown and for the purpose set forth.

2. In a draft-equalizer, the combination with an evener-bar A provided with means for attaching thereto a singletree and a doubletree, of a pair of short evener-bars pivoted to one side of the center of the evener-bar A, said bars having intermediate eyebolts $B^2$ for connecting thereto a clevis B', eyebolts $B^3$ attached adjacent to the outer ends of the short evener-bars, a loop C connected to said eyebolts, the doubletree attached to the evener-bar A passing through said loop C, a rod D connected to the loop C, and a doubletree connected to the forward end of the bar, substantially as shown and for the purpose set forth.

In testimony whereof I affix my signature in presence of two witnesses.

CHARLEY DAVISON.

Witnesses:
W. W. YOUNG,
NETTIE M. DORTCH.